United States Patent
Lewis et al.

(10) Patent No.: US 6,611,802 B2
(45) Date of Patent: *Aug. 26, 2003

(54) METHOD AND SYSTEM FOR PROOFREADING AND CORRECTING DICTATED TEXT

(75) Inventors: James R. Lewis, Delray Beach, FL (US); Barbara E. Ballard, Kansas City, MO (US); Gary R. Hanson, Palm Beach Gardens, FL (US); Kerry A. Ortega, Raleigh, NC (US); Ronald E. Vanbuskirk, Indiantown, FL (US); Arthur Keller, Boca Raton, FL (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/330,668

(22) Filed: Jun. 11, 1999

(65) Prior Publication Data

US 2002/0002459 A1 Jan. 3, 2002

(51) Int. Cl.[7] .............................................. G10L 13/00
(52) U.S. Cl. ..................................... 704/235; 704/260
(58) Field of Search ................................ 704/235, 257, 704/260, 275, 270, 276

(56) References Cited

U.S. PATENT DOCUMENTS

| | | | | |
|---|---|---|---|---|
| 4,914,704 A | * | 4/1990 | Cole et al. | 704/235 |
| 5,386,494 A | * | 1/1995 | White | 704/272 |
| 5,799,273 A | * | 8/1998 | Mitchell et al. | 704/235 |
| 5,809,464 A | * | 9/1998 | Kopp et al. | 704/235 |
| 5,864,805 A | * | 1/1999 | Chen et al. | 704/275 |
| 5,884,258 A | * | 3/1999 | Rozak et al. | 704/251 |
| 5,909,667 A | * | 6/1999 | Leontiades et al. | 704/275 |
| 6,023,678 A | * | 2/2000 | Lewis et al. | 704/260 |
| 6,064,961 A | * | 5/2000 | Hanson | 704/260 |
| 6,085,159 A | * | 7/2000 | Ortega et al. | 704/235 |
| 6,138,099 A | * | 10/2000 | Lewis et al. | 704/257 |
| 6,151,576 A | * | 11/2000 | Warnock et al. | 704/260 |
| 6,195,637 B1 | * | 2/2001 | Ballard et al. | 704/235 |
| 6,446,041 B1 | * | 9/2002 | Reynar et al. | 704/260 |

OTHER PUBLICATIONS

Halvorson et al.; Microsoft Office 97; pp. 263–287; 1997;.*

* cited by examiner

Primary Examiner—Tălivaldis Ivars Šmits
Assistant Examiner—Abul K. Azad
(74) Attorney, Agent, or Firm—Akerman Senterfitt

(57) ABSTRACT

A method of proofreading and correcting dictated text contained in an electronic document comprises the steps of: selecting proofreading criteria for identifying textual errors contained in the electronic document; playing back each word contained in the electronic document; and, marking as a textual error each played back word in nonconformity with at least one of the proofreading criteria. The method can further comprise the step of editing each the marked textual error identified in the marking step. In particular, the editing step can include reviewing each the marked textual error identified in the marking step; accepting user specified changes to each marked textual error reviewed in the reviewing step; and, unmarking each marked textual error corrected by the user in the accepting step. Also, the reviewing step can include highlighting each the word in the electronic document corresponding to the marked textual error marked in the marking step; and, displaying an explanation for each marked textual error in a user interface. Moreover, the reviewing step can further include suggesting a recommended change to the marked textual error; displaying the recommended change in the user interface; and, accepting a user specified preference to substitute the recommended change for the marked textual error.

28 Claims, 15 Drawing Sheets

METHOD AND SYSTEM FOR PROOFREADING AND CORRECTING DICTATED TEXT

BACKGROUND OF THE INVENTION

1. Technical Field

This invention relates to the field of computer speech dictation and more particularly to a method and system for proofreading and correcting dictated text in an electronic document.

2. Description of the Related Art

Speech technologies are continually making the interface between humans and multimedia computers more alive and efficient. Until recently, most dictation products relied on discrete speech. Discrete speech systems restricted dictation to single discretely spoken words having a pause in between each word. The latest products, however, understand continuous speech, so that the user can speak at a more or less normal rate. Continuous speech products, as would be expected, require more computing power than discrete speech recognition products do. There are two categories of PC-based continuous speech recognition software: dictation and command recognition. Speech dictation is the most compelling of the two.

An effective speech dictation program possesses the potential for making obsolete the traditional word processor. In contrast to the traditional word processor, in a speech dictation system, the user merely speaks into a microphone or other suitable voice gathering device, and watches the computer magically transform the spoken words into text on-screen. When using speech dictation, a user can produce a document essentially without a keyboard using computer-based voice recognition. Typically, the user can dictate the bulk of the text directly into the speech dictation system. Thereafter, the user can copy and paste the dictated text directly into a word processor. A few subsequent edits can produce a finished document.

All dictation programs include a dictionary, although the user must add to the dictionary words unknown to the speech dictation program, such as technical terms or proper names. In addition, the speech dictation program can require the user to dictate all punctuation marks, capitalization, and new paragraph breaks. Moreover, the user of a speech dictation system must adopt a dictation style that distinguishes between text and formatting instructions. Some speech dictation systems require the user to dictate text into a proprietary word processor, before cutting and pasting the results into the regular word processing or other application. Other speech dictation systems provide for the direct dictation into particular word processing programs.

There are three major components to the complete speech dictation process: text input, proofreading, and correction. The shift from discrete to continuous dictation has resulted in significant improvement to the speed of text input, from about 70 to 110 words per minute for reading text for transcription. Still, in composing a document using speech dictation, the user must first form the base idea for the document; the user must elaborate or refine that idea; the idea must be described and connected in a coherent form; vocabulary must be carefully chosen; and the grammar, syntax, and the very appearance of words on the page must be carefully prepared. Thus, attempting to publish a document, even if using a speech dictation tool, can prove to involve a great deal of intellectual and manual labor. Additionally, if the manuscript requires revision, the labor involved in proofreading and correction can become repetitive. In consequence, many still produce documents directly, manually performing thousands of keystrokes.

Thus, it is apparent that current speech dictation systems do not effectively address the proofreading and correction components of the speech dictation process. Focus on the proofreading and correction process could otherwise result in a significant reduction in the time required per correction. Hence, an effective proofreading and correction system would significantly improve dictation throughput in terms of correct words per minute. Proofreading, however is a process that is wholly lacking in present computerized speech dictation systems.

SUMMARY OF THE INVENTION

The invention concerns a method and system for proofreading and correcting dictated text. The invention as taught herein has advantages over all known methods now used to proofread and correct dictated text, and provides a novel and nonobvious system, including apparatus and method, for proofreading and correcting dictated text. A method of proofreading and correcting dictated text contained in an electronic document comprises the steps of: selecting proofreading criteria for identifying textual errors contained in the electronic document; playing back each word contained in the electronic document; and, marking as a textual error each played back word in nonconformity with at least one of the proofreading criteria.

The selecting step can include specifying a low confidence word threshold below which any word will be identified as a textual error; enabling homonym and confusable word criteria whereby any homonym and confusable word will be identified as a textual error; and, specifying a word grade level above which any word will be identified as a textual error. The selecting step can also include generating a grammar rules check list for reference by a grammar checker; and, enabling grammar checking whereby any word or phrase inconsistent with the grammar rules will be identified as a textual error.

The playing back step can include highlighting each the word contained in the electronic document; and, visually displaying each the highlighted word in a user interface. In addition, the displaying step can include visually displaying immediately before the visually displayed highlighted word at least one word preceding the highlighted word in the electronic document; and, visually displaying immediately after the visually displayed highlighted word at least one word succeeding the highlighted word in the electronic document. Moreover, the playing back step can further include providing user voice audio playback using user voice data corresponding to each the highlighted word in the electronic document in coordination with the visually displaying step; generating text-to-speech audio playback for each the highlighted word in the electronic document not having corresponding user voice data; and, providing the text-to-speech audio playback in coordination with the visually displaying step.

The marking step can comprise manually marking as a textual error each replayed word suspected of violating at least one of the proofreading criteria. In addition, the marking step can include automatically marking as a textual error each replayed word inconsistent with the proofreading criteria. The marking step can further include manually marking as a textual error each replayed word suspected of violating at least one of the proofreading criteria, the manually marking step occurring simultaneous to the automatic marking step.

The method as described herein can further comprise the step of editing each the marked textual error identified in the marking step. In particular, the editing step can include reviewing each the marked textual error identified in the marking step; accepting user specified changes to each marked textual error reviewed in the reviewing step; and, unmarking each marked textual error corrected by the user in the accepting step. Also, the reviewing step can include highlighting each the word in the electronic document corresponding to the marked textual error marked in the marking step; and, displaying an explanation for each marked textual error in a user interface. Moreover, the reviewing step can further include suggesting a recommended change to the marked textual error; displaying the recommended change in the user interface; and, accepting a user specified preference to substitute the recommended change for the marked textual error. The editing step can further include, the step of unmarking each the marked textual error corresponding to a user command to unmark the marked textual error.

An electronic system for proofreading and correcting dictated text in an electronic document can comprise: a proofreading tool for identifying and correcting textual errors in the electronic document; a proofreading options interface for storing proofreading criteria for use with the proofreading tool; and, a control panel for interacting with the proofreading tool. The electronic system can further comprise a voice command processor for controlling the user interface.

The proofreading tool can include a playback system for playing back the dictated text; a marking tool for identifying and marking textual errors contained in the dictated text; and, a mark processor for editing the marked textual errors identified by the marking tool. Specifically, the playback system can include a highlighter for sequentially distinguishing each word contained in the dictated text; means for providing user voice audio playback for the distinguished words having corresponding user voice data; and, a text-to-speech generator for producing audio playback for distinguished words not having corresponding user voice data required by the user voice audio playback means.

The marking tool can include any combination of the following three components. In one embodiment, the marking tool have an automated marking tool for automatically identifying and marking textual errors exceeding thresholds specified in the proofreading criteria. Yet, in another embodiment of the present invention, the marking tool can have manual marking tool for manually identifying and marking textual error in response to a user command to mark the textual error. In yet another embodiment, the marking tool can further include the automated marking tool for automatically whereby the automated marking tool can operate concurrent to the manual marking tool. Moreover, in yet another embodiment, the marking tool can further include a grammar checker for identifying grammatically errors contained in the electronic document.

The mark processor can comprise a highlighter for sequentially distinguishing each word contained in the dictated text identified and marked as a textual error by the marking tool; an explanation engine having explanations for each textual error; messaging means for transmitting the explanations to the control panel; and, means for editing the textual error. The mark processor can further include a suggestion engine having suggested corrections to each textual error; and, messaging means for transmitting the suggested corrections to the control panel.

The proofreading options interface can include a low confidence word control for specifying a low confidence word threshold below which any word will be identified as a textual error; a homonyms and confusable words switch for enabling the marking of homonyms and confusable words; and, a word grade level control for specifying a word grade level above which any word will be identified as a textual error. In another embodiment, the proofreading options interface can include a grammar rules control interface containing grammar rules for reference by a grammar checker; and, a grammar rules switch for enabling marking of words or phrases inconsistent with the grammar rules by the grammar checker.

The control panel can include a mark problems view for controlling the marking tool; and, a work with marks view for controlling the mark processor. The mark problems view can include a playback speed control for prescribing a rate of playback by the playback system; a pause button for accepting a command to pause the playback of the dictated text; a mark button for accepting a user command to manually mark the displayed word as a textual error; message transmitting means for transmitting the mark command to the marking tool; message transmitting means for transmitting the prescribed rate and the pause command to the playback system; message receiving means for receiving each word played back by the playback system; and, a text window for displaying each word received by the message receiving means.

The work with marks view can include message receiving means for receiving data from the mark processor; and, a status line for displaying an explanation generated by an explanation engine and received by the message receiving means. The work with marks view can further include a suggestion panel for displaying a suggested correction generated by a suggestion engine and received by the message receiving means; a suggestion button for accepting a user specified preference to substitute the suggested correction for the marked textual error; and, message transmitting means for transmitting the substitution preference to the mark processor.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

Figure 1:
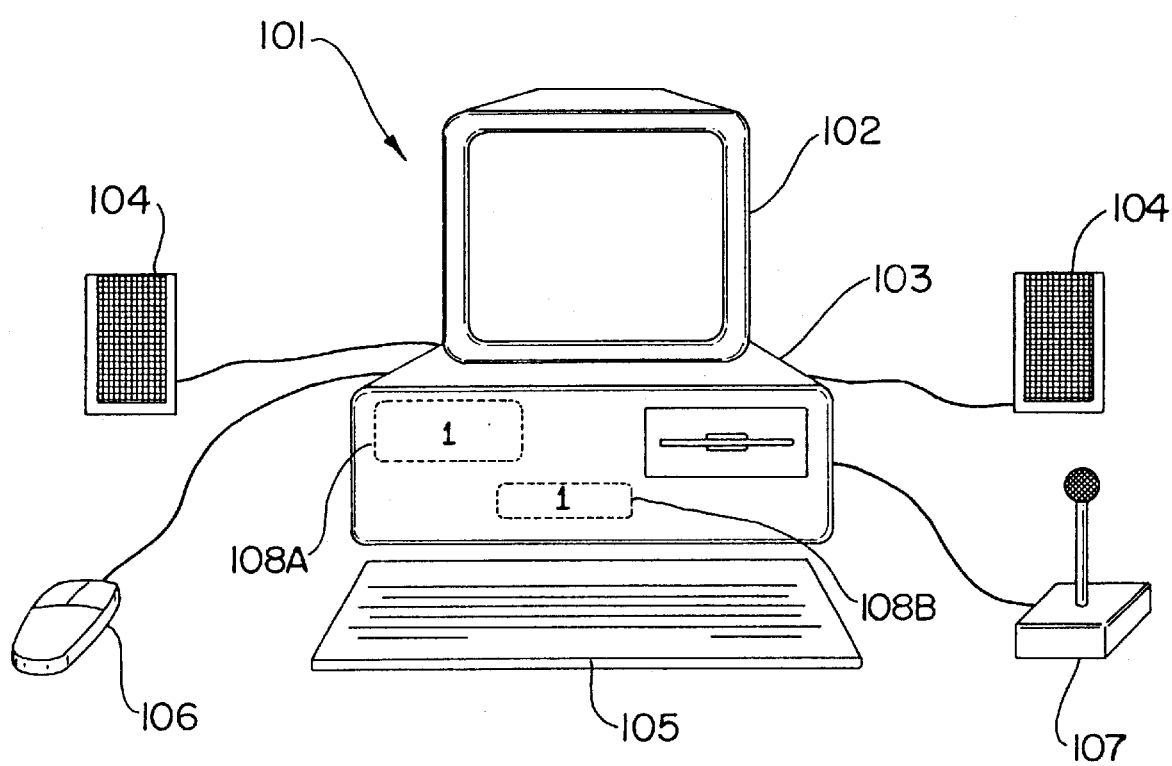
FIG. 1 is a pictorial representation of a computer system for speech recognition on which the system of the invention can be used.

FIG. 1 shows a typical computer system 101 for use in conjunction with the present invention. The system preferably is comprised of a computer 103 including a central processing unit (CPU), one or more memory devices and associated circuitry. The system also includes a microphone 107 operatively connected to the computer system through suitable interface circuitry or "sound board" (not shown), a keyboard 105, and at least one user interface display unit 102 such as a video data terminal (VDT) operatively connected thereto. The CPU can be comprised of any suitable microprocessor or other electronic processing unit, as is well known to those skilled in the art. An example of such a CPU would include the Pentium, Pentium II, or Pentium III brand microprocessor available from Intel Corporation, or any similar microprocessor. Speakers 104, as well as an interface device, such as mouse 106, can also be provided with the system, but are not necessary for operation of the invention as described herein. The various hardware requirements for the computer system as described herein can generally be satisfied by any one of many commercially available high speed multimedia personal computers offered by manufacturers such as International Business Machines (IBM), Compaq, Hewlett Packard, or Apple Computers.

Figure 2:
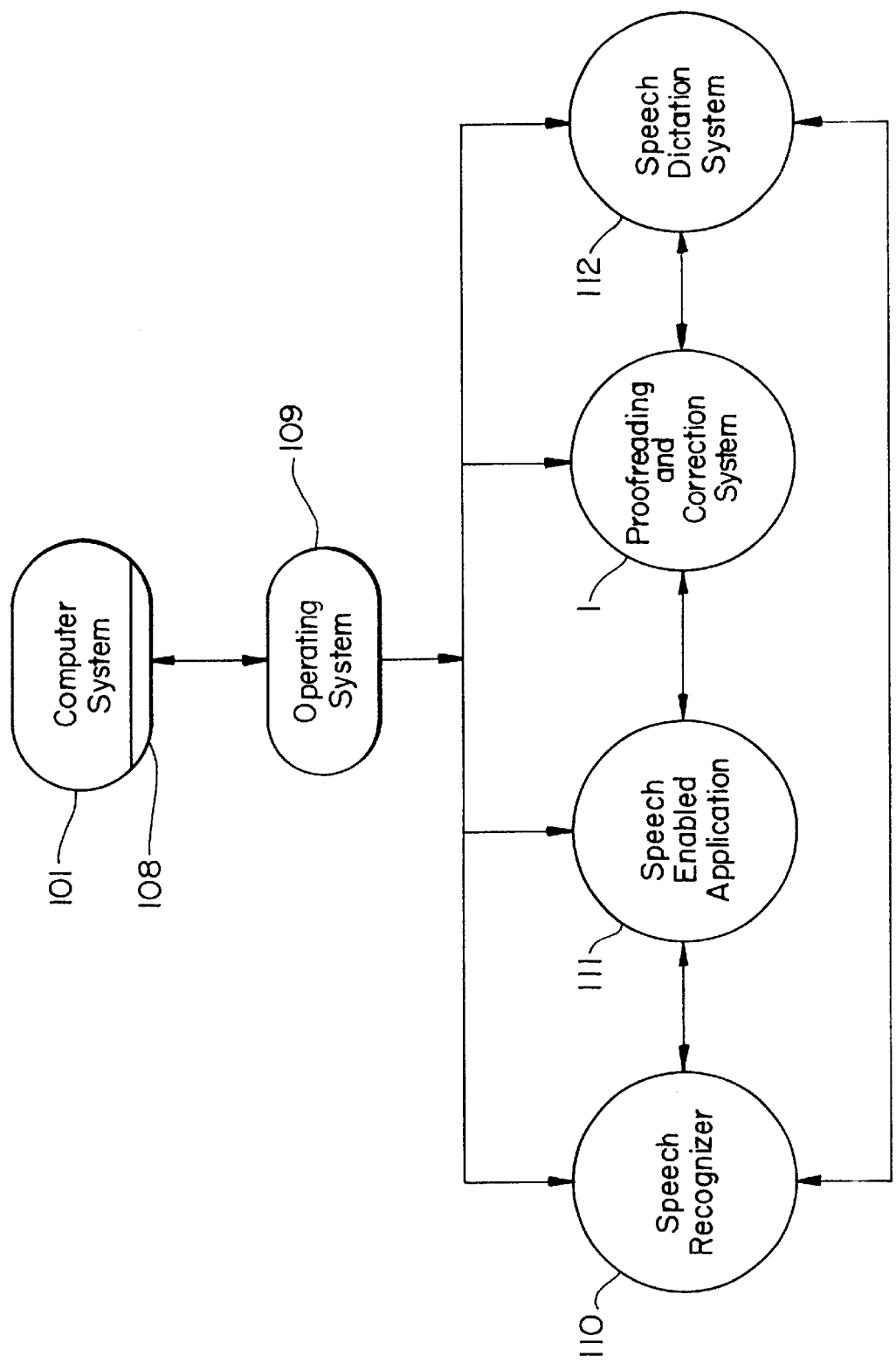
FIG. 2 is a block diagram showing a typical high level architecture for the computer system in FIG. 1.

FIG. 2 illustrates a preferred architecture for a speech dictation system in computer 101. As shown in FIG. 2, the system can include an operating system 109, a speech recognizer 110, a speech dictation system 112, and a proofreading and correcting system 1 in accordance with the inventive arrangements. A speech enabled application 111 can also be provided. In FIG. 2, the speech recognizer 110, the speech enabled application 111, the speech user interface 112 and the proofreading and correcting system 1 are shown as separate application programs. It should be noted, however, that the invention is not limited in this regard, and these various applications could, of course, be implemented as a single, more complex applications program.

In a preferred embodiment which shall be discussed herein, operating system 109 is one of the Windows® family of operating systems, such as Windows NT®, Windows 95® or Windows 98® which are available from Microsoft Corporation of Redmond, Wash. However, the system is not limited in this regard, and the invention can also be used with any other type of computer operating system, for example, IBM AIX®, Sun Solaris®, or Linux. The system as disclosed herein can be implemented by a programmer, using commercially available development tools for the operating systems described above. As shown in FIG. 2, computer system 101 includes one or more computer memory devices 108, preferably an electronic random access memory 108A and a bulk data storage medium, such as a magnetic disk drive 108B.

Audio signals representative of sound received in microphone 107 are processed within computer 101 using conventional computer audio circuitry so as to be made available to operating system 109 in digitized form. The audio signals received by the computer 101 are conventionally provided to the speech recognizer 110 via the computer operating system 109 in order to perform speech recognition functions. As in conventional speech recognition systems, the audio signals are processed by the speech recognizer 110 to identify words spoken by a user into microphone 107. Ultimately, the identified words are passed to the speech dictation system 112 for insertion in an electronic document. Subsequently, the proofreading and correcting system 1 can perform proofreading functions on the dictated text contained in the electronic document.

Figure 3A:
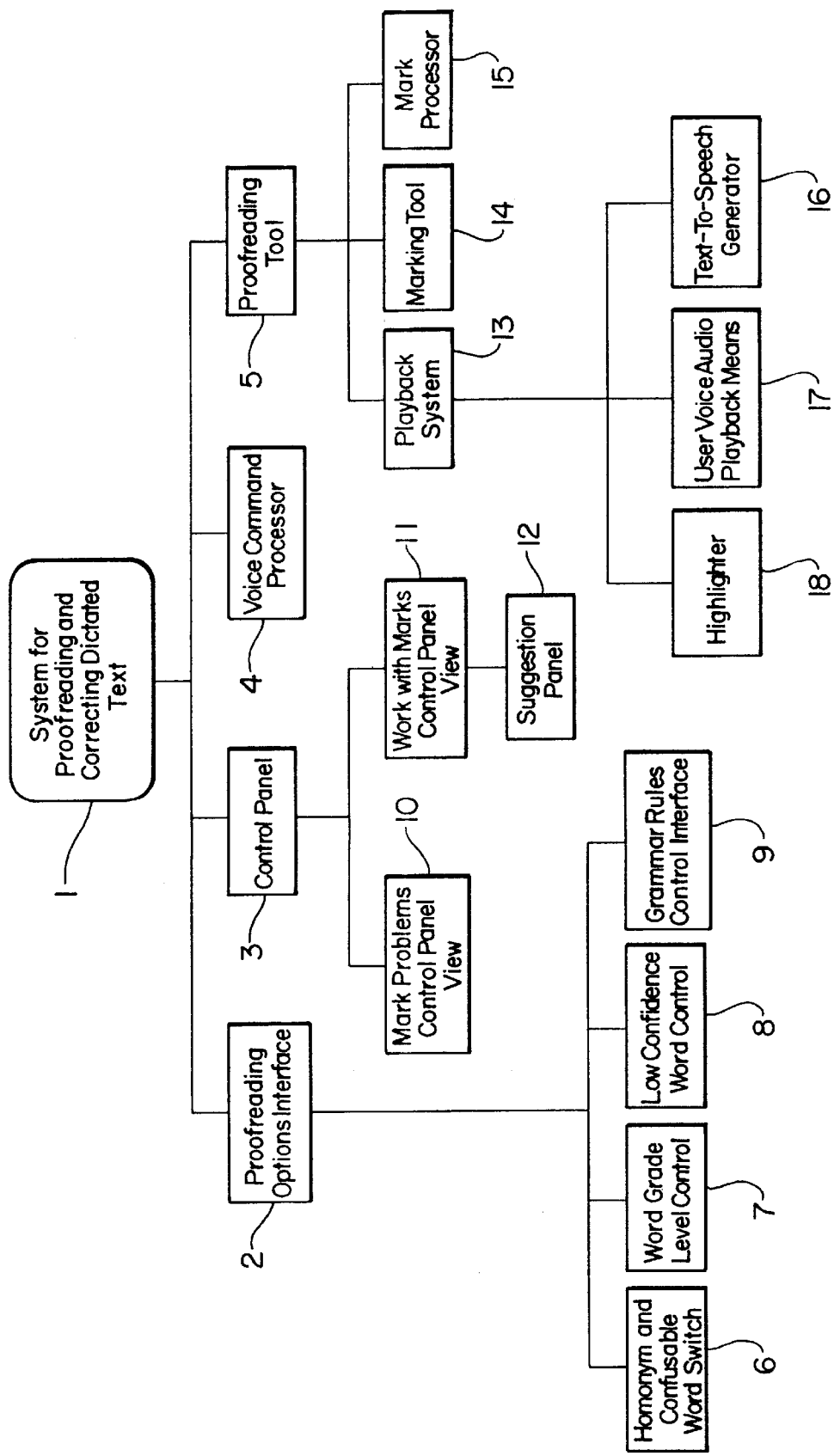
FIGS. 3A–3C, taken together, are a block diagram illustrating the preferred architecture for a general purpose system for proofreading and correcting dictated text.
Figure 3B:
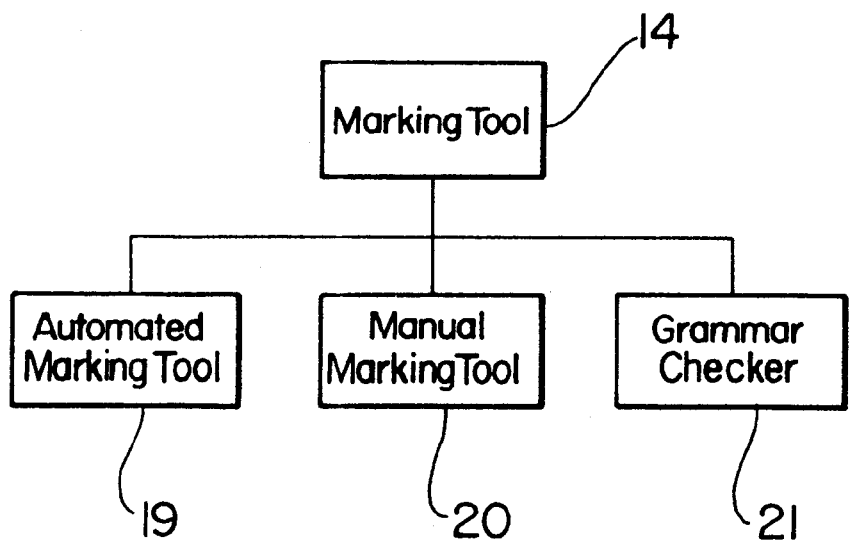
Figure 3C:
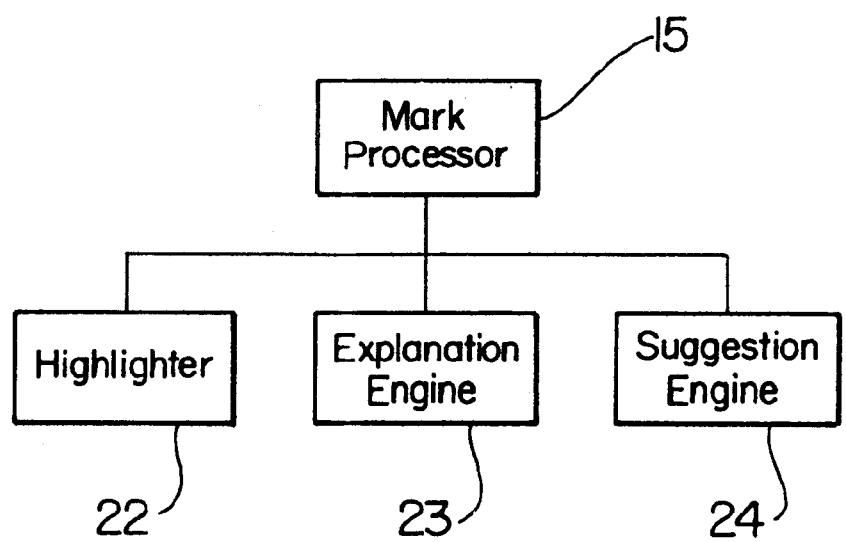

FIGS. 3A–3C, taken together, are a block diagram illustrating the preferred architecture for a general purpose system for proofreading and correcting dictated text 1. According to the preferred arrangement, the user interface (UI) components of the system 1 include a proofreading options interface 2, and one control panel 3 with two views: one for finding and marking problems and one for finding marks and fixing problems. The primary goal of the preferred embodiment UI is to provide users with a proofreading tool that is general purpose, but also can be sensitive to the problems ordinarily encountered in a speech dictation system. Persons skilled in the relevant art will recognize that a proofreading UI should facilitate a user's smooth traversal of an electronic document without requiring the user to stop. Alternatively, the user should be able to pause and make corrections and other edits as necessary. Also, users should be able to mark the location of desired edits without actually making the changes. Finally, users of a speech recognition tool should be able to direct the proofreader to automatically mark certain types of problem areas, in particular, low-confidence recognitions and grammatical problems associated with speech dictation, for example run-on sentences which naturally occur when a user neglects to dictate punctuation. Accordingly, the preferred system 1 can include both the mark problems view and the work with marks view to support this system flexibility. In the preferred embodiment, the work with marks view preferably can include a suggestion panel 12 for displaying a suggested remedy for each marked problem.

Proofreading flexibility necessarily includes the ability for a user to specify the sensitivity with which the system should conduct automatic marking of certain problem areas. By way of example, an effective system can include automatic grammar checking, automatic proofreading with respect to homophones and confusable words, automatic flagging of words which exceed a preset grade level, and the automatic detection of words falling below a preset, user-specified confidence level. Recognizing this needed flexibility, as shown in FIG. 3A, the proofreading options interface 2 preferably can include a homonym and confusable word switch 6, a word grade level control 7, a low confidence word control 8, and a grammar rules control interface 9, all of which incorporate into the inventive arrangement the aforementioned flexibility.

The preferred system 1 also can have a voice command processor 4 for processing voice commands for the preferred system, and a proofreading tool 5. Still, one skilled in the art will understand that not only can the proofreading tool 5 be integrated with a speech-enabled application, but also the proofreading tool 5 can exist separate and apart from other computer applications. The proofreading tool 5 in the present embodiment preferably includes a playback system 13, a marking tool 14, and a mark processor 15. With respect to the playback system 13, the present system 1 can allow users to play back the speaker's original voice dictation using user voice audio playback means 17 during the proofreading process. Additionally, the preferred system 1 preferably employs synchronous overlap and add (SOLA) compression for the high-quality control of the speed of playback of the dictated audio. Notably, SOLA can speed up the playback of speech audio without increasing pitch. Where the speaker's original voice dictation is unavailable, the preferred system 1 can provide a text-to-speech interpretation of the dictated text using the text-to-speech generator 16. Though listening to the original dictation while visually scanning the document can assist users in finding discrepancies between the dictation and the recognized text, the preferred system 1 can preferably allow the user to suppress audio playback entirely.

Finally, the preferred system 1 preferably has a highlighter 18 for providing a visual cue as to the current text under consideration. Specifically, the preferred system 1 can include means for both visually displaying the current word in a separate window and for visually indicating the current word in the electronic document. In the present embodiment, the preferred system 1 can display the current word in the mark problems control panel view 10 and can underline the current word in the electronic document in speech-enabled application 111. Alternatively, the preferred system 1 can provide an animated "bouncing cursor" in the electronic document to focus the user's attention on the appropriate text.

FIG. 3B discloses the structure of marking tool 14. Preferably, marking tool 14 can include an automated marking tool 19, a manual marking tool 20, and a grammar checker 21. Whereas the manual marking tool 20 allows the user to manually mark textual errors in the dictated text during playback, the automated marking tool 19 can perform proofreading automatically in the background, marking as textual errors, words inconsistent with settings stored in the proofreading options interface 2. Similarly, the grammar checker 21 can reference settings stored in the grammar rules control interface 9 to automatically mark suspected grammar errors in the dictated text.

FIG. 3C discloses the structure of the mark processor 15 for use in reviewing marks generated during the marking phase of proofreading. Preferably, the mark processor 15 can include a highlighter 22, similar in functionality to the highlighter 18 in the playback system 13, an explanation engine 23, and a suggestion engine 24. Like highlighter 18 in the playback system 13, highlighter 22 can display the marked word or phrase in the work with marks control panel view 11 and can underline the marked word or phrase in the electronic document in speech-enabled application 111. Explanation engine 23 can provide an explanation to the user for the automatic marking of the current word or phrase. The explanation preferably can be displayed in the work with marks control panel view 11 and can assist the user in determining whether to make a change to the marked word or phrase, or to ignore the mark. When the system 1 does identify an error, the suggestion engine 24 can suggest an alternative text for the identified problem area. Preferably, similar to the case of the explanation engine 23, the preferred system 1 can display the suggestion in the suggestion panel 12 contained as part of the work with marks control panel view 11.

Figure 3D:
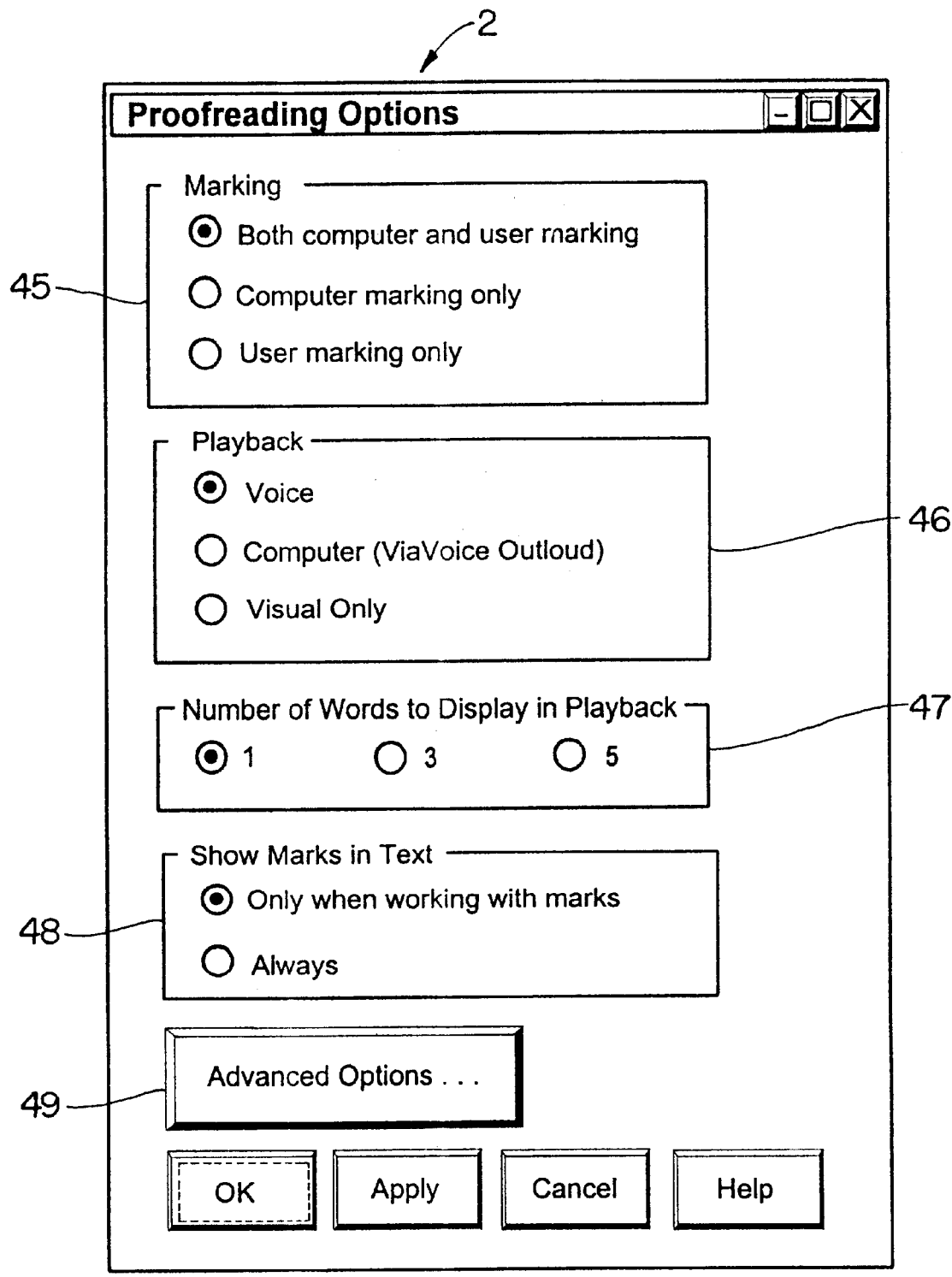
FIG. 3D shows a proofreading options interface for use with the general purpose system for proofreading and correcting dictated text of FIGS. 3A–3C.

FIG. 3D shows the proofreading options interface 2 for use with the preferred system 1. The proofreading options interface 2 allows the user to set the preferred marking method and playback style. Using the marking control 45, the user can choose one of three marking methods: computer marking only, user marking only, or both computer and user marking. When the user chooses computer marking only, the automated marking tool 19, when invoked, will perform proofreading automatically in the background, marking as textual errors, words inconsistent with settings stored in the proofreading options interface 2. Likewise, when the user chooses user marking only, the manual marking tool 20 will allow the user to manually mark textual errors in the dictated text during playback. Of course, choosing both computer and user marking while cause the automated marking tool 19 to run in the background during the use of the manual marking tool 20.

The playback options control 46 allows the user to choose voice playback, text-to-speech playback, or visual playback. Choosing voice playback will cause the preferred system 1 to provide audio playback of the speaker's voice whenever possible. When the speaker's voice is unavailable, the preferred system 1 can automatically switch to playback with text-to-speech, switching back to voice playback when possible. Alternatively, choosing text-to-speech causes exclusively text-to-speech playback of the dictated text. Finally, the visual only radio button restricts playback to audio-free playback.

Proofreading options interface 2 also permits the user to choose the number of words to display during playback. In the preferred embodiment, the number of words control 47 determines how many words appear in the mark problems control panel view 11 during playback. The number of words control 47 allows the user to choose single word playback, three word playback, or five word playback. The proofreading options interface 2 preferably contains show marks control 48 for controlling when the highlighter 22 underlines marked words in the electronic document. The user can choose between persistent highlighting at all times, or highlighting only when using the mark processor 15. Finally, the proofreading options interface 2 also includes advanced options button 49 for invoking an advanced options interface.

Clicking on the advanced options button 49 in the proofreading options interface preferably can invoke an advanced options interface 50 as shown in FIG. 4E. In the preferred embodiment, advanced options interface 50 includes the homonyms and confusable words switch 6, the word grade level control 7, the low confidence word control 8, and grammar rules control switch 26. Checked by default in the preferred embodiment, the low confidence words control 7 enables the automatic marking of low-confidence words automated marking tool 19. In the preferred embodiment, low-confidence words are determined based upon the value of the combined acoustical value returned from the speech recognizer 110 for a specific word and the surrounding words, and appropriate language model values, for instance perplexity. The slider portion of the low confidence words control 7 allows the user to adjust the overall confidence setting used to mark low-confidence words.

In the preferred embodiment, when checked, the homonyms and confusable words switch 6 enables the automatic marking by the automated marking tool 19 of words defined as homonyms or confusable. Similarly, the word grade level control 7, when checked as in the default case, enables the marking of words that exceed a specified grade level. Using the drop down box incorporated in the word grade level control 7, the user can choose from a list of grade levels, preferably ranging from 4 to 12. Finally, grammar rules switch 26, when checked as in the default case, enables the automated marking by the automated marking tool 19 of words or phrases identified as problems by the grammar checker 21. By clicking on the edit grammar rules button 25, the user can invoke the grammar rules control interface 9 for specifying the exact grammar rules 27 to be considered by the grammar checker 21.

Figure 3E:
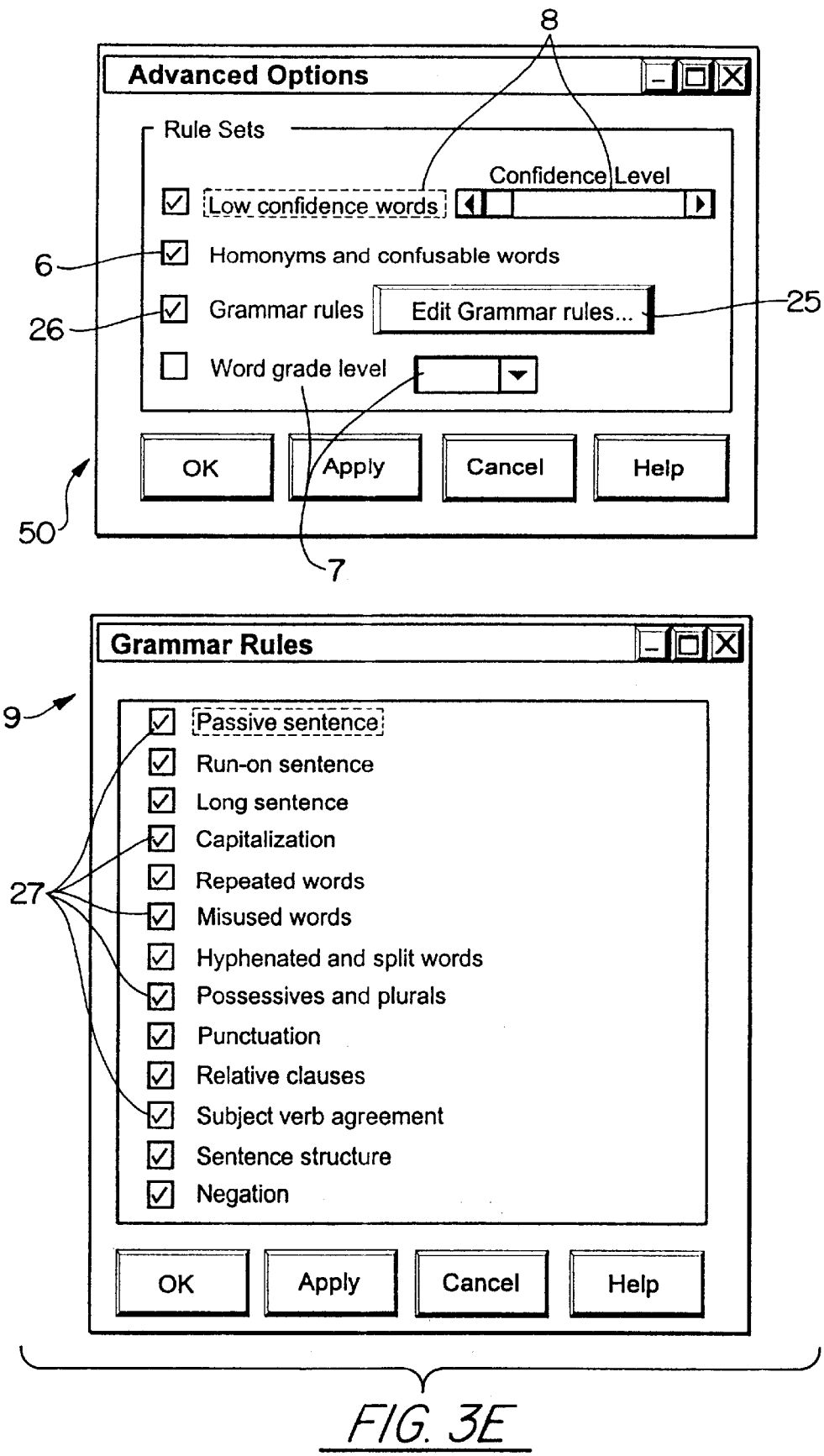
FIG. 3E shows an advanced proofreading options interface for use in conjunction with the proofreading options interface shown in FIG. 3D, and a grammar rules option interface for use in conjunction with the advanced proofreading options interface.
Figure 3F:
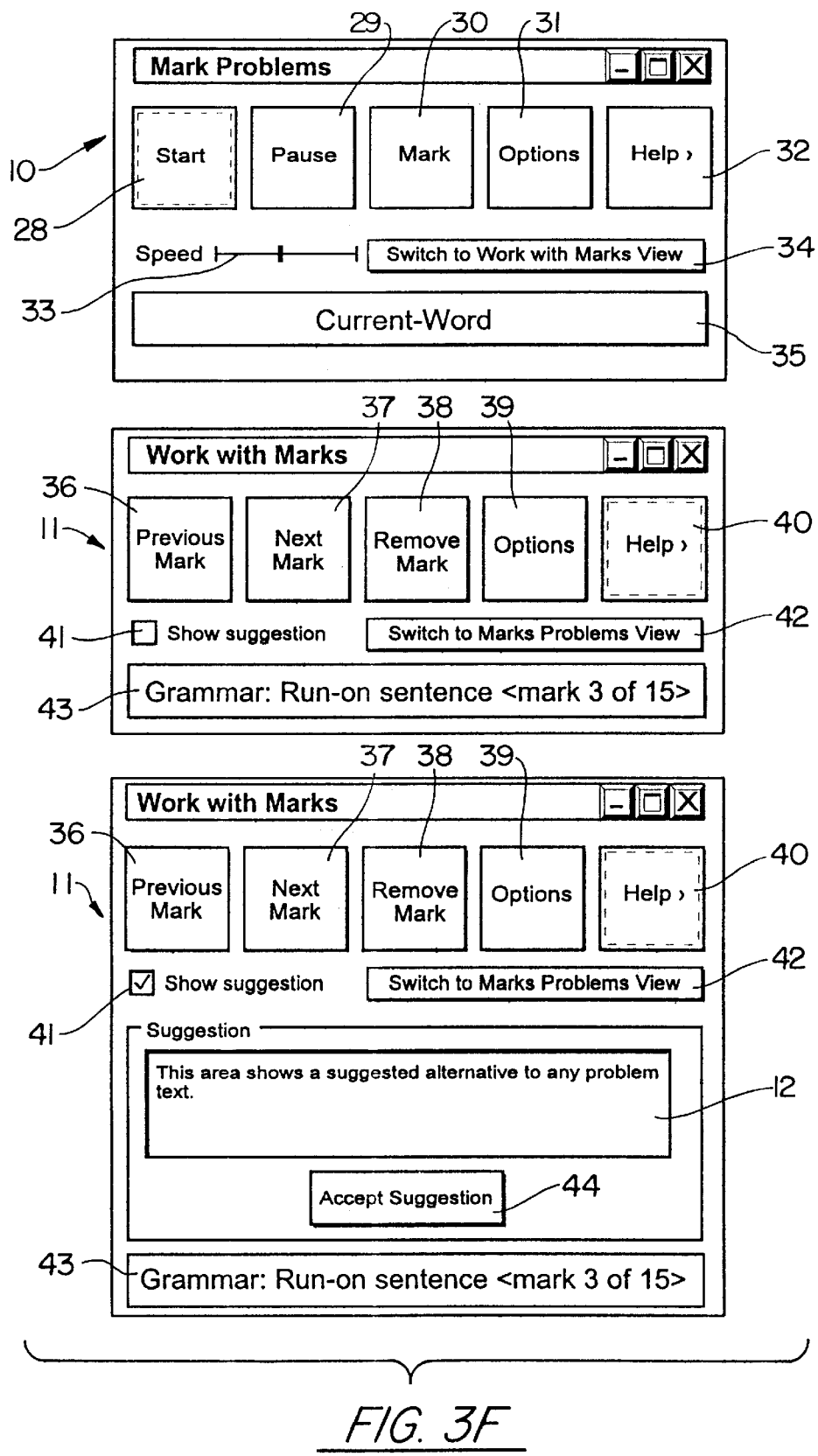
FIG. 3F illustrates the control panel portion of the general purpose system for proofreading and correcting dictated text as shown in FIGS. 3A–3C.

FIG. 3F illustrates the control panel portion of the preferred system 1 for use when proofreading dictated text. The control panel 3 includes two control panel views: the mark problems control panel view 10 and the work with marks control panel view 11. As playback system 13 plays back the dictated text during proofreading, the dictated text in the speech-enabled application 111 preferably can scroll as required to keep the current word visible to the user. One skilled in the art will recognize that, to facilitate viewing, aside from scrolling, the preferred system 1 can, where possible, remove the text with current proofreading focus away from the mark problems control panel view 10.

When using the marking tool 14, the user preferably can maintain complete control of the marking process. Unless the user has highlighted a section of text in the electronic document contained in the speech-enabled application 111, the marking tool 14 will begin at the current cursor position and will continue the marking process until stopped by the user using pause button 29, or until reaching the end of the document. If the user has highlighted a section of text for proofreading, the preferred system 1 will act analogously to the spell checking tool in Microsoft Word®.

By clicking start button 28, the proofreading tool 5 begins the proofreading process. Clicking the pause button 29 temporarily stops proofreading and the start button 28 label changes to "Resume". The pause button 29 finds particular utility where the user desires to make an immediate correction to the dictated text. In that event, the user can pause the execution of the proofreading tool to make the correction, and subsequently can resume proofreading. Playback speed control 33 controls the speed of playback by the playback system 13. Though, in the preferred embodiment, the speed of playback is set by default to 120 words per minute, the user can adjust this speed setting by manipulating the slider control incorporated into the playback speed control 33. Preferably, the speed can vary from 60 words per minute to 360 words per minute. During playback, the current word preferably appears centered in the current-word text box 35, with the number of words appearing corresponding to the number of words specified in the number of words control 47.

During playback, clicking the mark button 30 preferably can place an invisible mark in the dictated text for later consideration by the mark processor 15. Significantly, choosing the mark button 30 will not interrupt the playback system 13. Also, choosing the options button 31 will invoke the proofreading options interface 2 as illustrated in FIG. 3D. Similarly, choosing help button 32 will pause playback, if necessary, and will display the help menu (not shown). Finally, choosing the switch to work with marks view button 34 will invoke the mark processor 15 and the work with marks control panel view 11.

By default, the scope of the text defined for the mark processor 15 follows from the text defined by the user for the marking tool 14. Unless the user has highlighted a portion of dictated text, the mark processor 15 will begin analyzing the text marked by the marking tool 14 at the current cursor position. The work with marks control panel view 11 contains a status line 43 for providing an explanation for the current mark, supplied by the explanation engine 23. Explanations can take the form of "Marked by user: <user name>", "Low confidence word(s)", "Homonym or confusable word: <list alternates", or "Grammar rule: <rule>". Following the explanation and enclosed in angle brackets in the status line 43 is an indication of the present mark number and the total number of marks in the dictated text. If there are no marks in a portion of the electronic document selected for proofreading, the status line 43 will indicate the same.

By clicking on next mark button 37, the mark processor 15 will process the next mark, the highlighter 22 will underline the affected text in the electronic document, and the status line 43 will indicate the reason for the mark. Notably, the user preferably can maintain the ability to edit the electronic document directly during the mark processing phase of proofreading. Preferably, editing a portion of text having a mark will cause the removal of the affected mark. The previous mark button 36 has the contrary effect of the next mark button 37. Choosing the previous mark button 36 will cause the mark processor 15 to load the previous mark. Correspondingly, the highlighter 22 will underline the associated affected dictated text.

Choosing the remove mark button 38 will erase the current mark. Preferably, the user will choose to remove a mark if the user has decided against a previously placed user mark. Alternatively, the user can choose to remove a mark if the user disagrees with a mark placed by the automated marking tool 19. Like the options button 31 in the mark problems control panel view 10, choosing the options button 39 in the work with marks control panel view 11 will invoke the proofreading options interface 2. Similarly, choosing help button 40 will display the Help drop-down menu (not shown). Finally, clicking on the switch to mark problems view button 42 will invoke the mark problems control panel view 10 and the marking tool 14.

Checking the show suggestion check box 41 in the work with marks control panel view 11 will modify the wort with marks control panel view 11 to include suggestion panel 12. The suggestion panel 12 preferable contains a suggestion area and an accept suggestion button 44. The suggestion panel 12 can show, if available, a suggested alternative to the marked text, supplied by the suggestion engine 24. If a suggestion is available, choosing the accept suggestion button 44 will cause the replacement of the highlighted text with the suggested text. In addition, the mark processor 15 will iterate to the next or previous mark, depending upon the direction the user was moving prior to encountering the current mark.

Figure 3G:
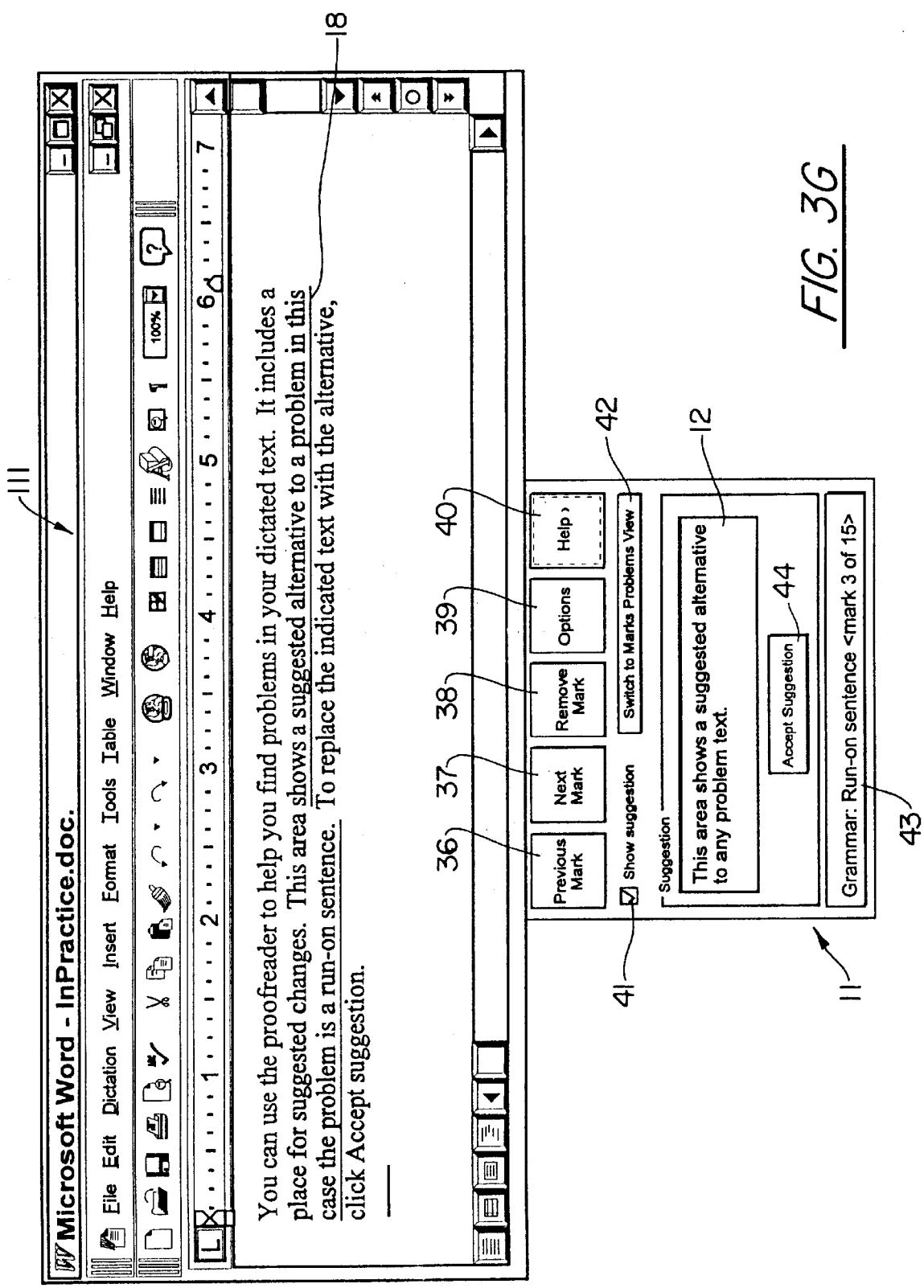
FIG. 3G shows the work with marks control panel view illustrated in FIG. 3E used in coordination with a speech-enabled application.

FIG. 3G shows the work with marks control panel view 11 illustrated in FIG. 3E used in coordination with a speech-enabled application 111. From the drawing, one skilled in the art can recognize the effect of the highlighter 22 as shown by underlining 18. In addition, status line 43 contains an explanation for the marked text, supplied by the explanation engine 23. One skilled in the art will also recognize that it is possible for two marks to overlap. For instance, consider the case where there exists a run-on sentence that contains a low confidence word. In that case, the marking tool 14 can highlight the first mark, first. If one mark completely encompasses another, the mark processor 15 will treat the mark with the broadest reach first. Once handled by the user, the mark processor 15 will treat the next narrowest mark within the broader mark, if it has not already been edited out or removed.

Figure 4:
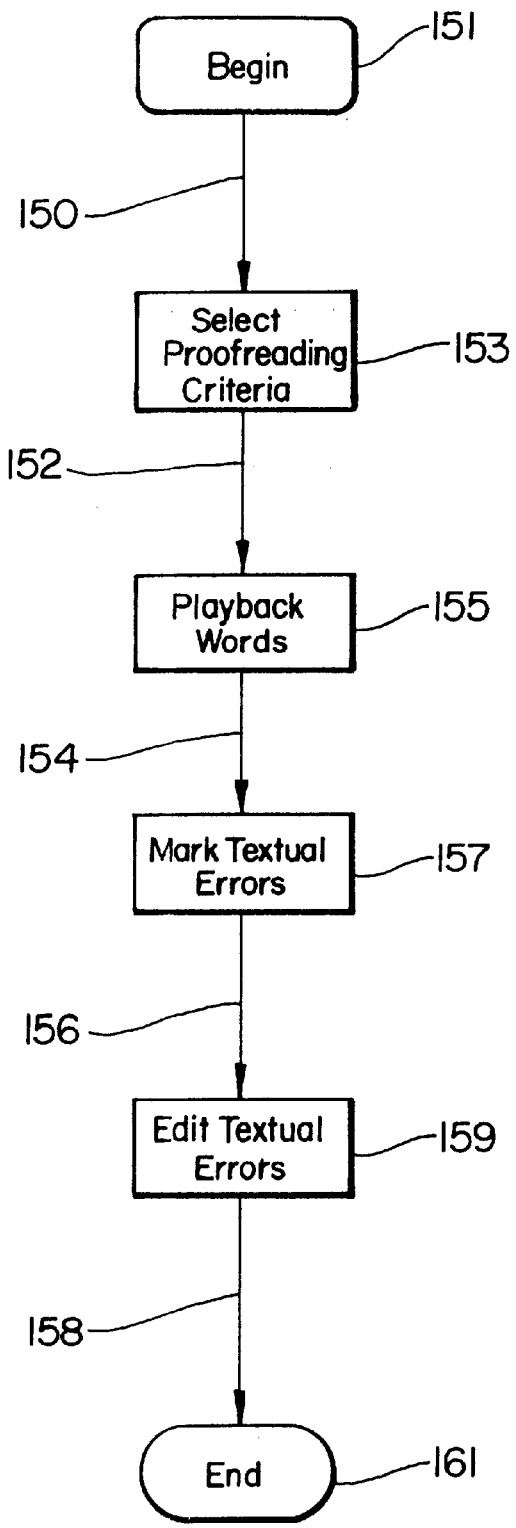
FIG. 4 is a flow chart illustrating a method for proofreading and correcting dictated text.

FIG. 4 is a flow chart illustrating a method for proofreading and correcting dictated text. According to the inventive arrangement, the user can begin the proofreading process at block 151, following the path 150 to block 153 in which the user can select proofreading criteria for use with the marking tool 14. Following path 152 to block 155, the user can begin the marking phase of the proofreading process by playing back the dictated text contained in the electronic document. Following path 154 to block 157, while playing back the dictated text, either the user or the preferred system 1 can mark textual errors identified during the playback step 155. Having identified and marked the textual errors in step 157, following path 156 to block 159, the user can edit, correct or ignore the marked textual errors. Finally, following path 158 to block 161, the user can terminate the preferred method.

Figure 5:
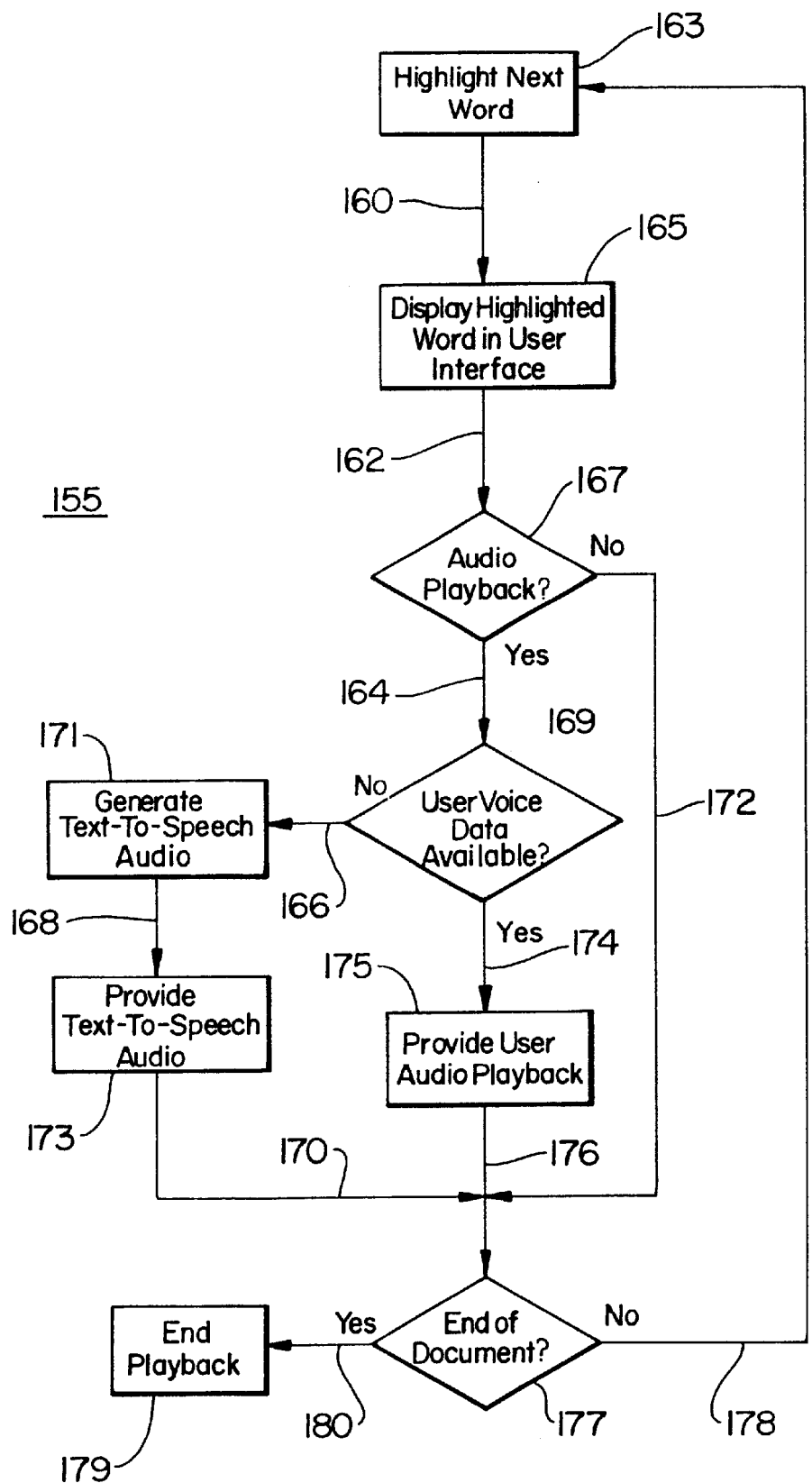
FIG. 5 is a flow chart showing a method for playing back words for use with the method illustrated in FIG. 4.

FIG. 5 is a flow chart showing a method for playing back words, as identified in block 151, for use with the preferred method illustrated in FIG. 4. The playback process can begin in block 163 by highlighting the next available word in the electronic document. Following path 160 to block 165, the preferred process can display the highlighted word in a user interface, for instance in the mark problems control panel view 10. Following path 162 to decision block 167, if the user has chosen audio playback in the playback control 46 of the proofreading options interface 2, and, following path 164 to decision block 169, if user voice data is available for the highlighted word, following path 174 to block 175, the playback system 13 will provide user audio playback using the user voice audio playback means 17. Alternatively, if user voice data is not available in decision block 169, the playback system 13 will provide text-to-speech audio in block 173, provided by the text-to-speech generator 16. If, in decision block 167, however, audio playback has not been selected, audio playback will not be provided. Following path 172 to decision block 177, if the playback system 13 has not reached the end of the electronic document, then following the path 178, the next available word can be highlighted in block 163 by the highlighter 18. Otherwise, following path 180 to block 179, the playback step 155 will terminate.

Figure 6:
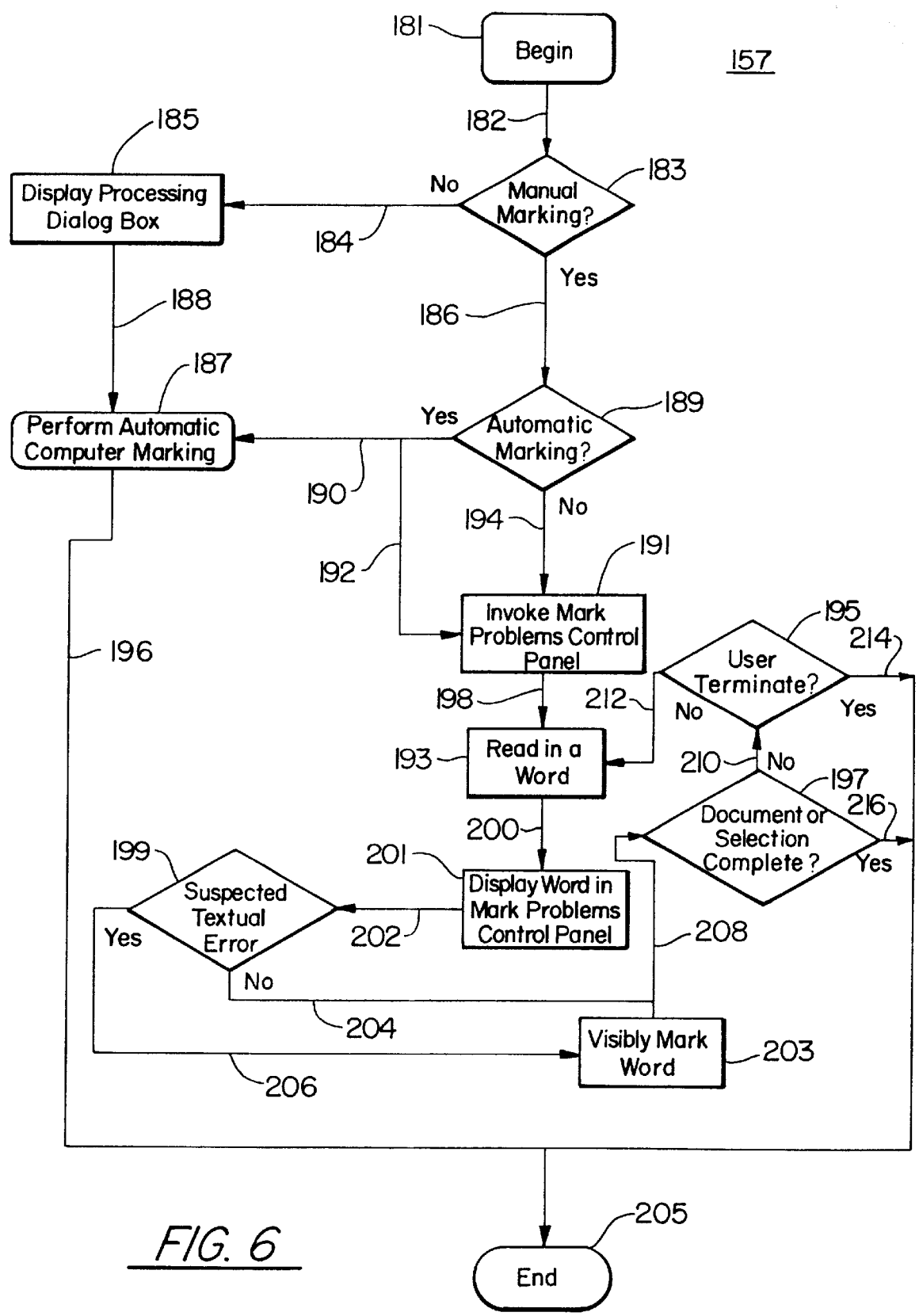
FIG. 6 is a flow chart showing a method for marking textual errors in an electronic document for use with method illustrated in FIG. 4.

FIG. 6 is a flow chart showing a method for marking textual errors in an electronic document, as identified by block 157, for use with method illustrated in FIG. 4. The process of marking textual errors identified by block 157 in FIG. 4 begins by consulting the proofreading options interface 2 for the user selection in the marking control 45. As indicated by decision block 183, if automatic computer marking has been selected, then following path 184 to block 185, pursuant to block 187, the automated marking tool 19 preferably can perform an automatic computer marking of the electronic document, during which time, as in block 185, a processing dialog box preferably can be displayed.

If, on the other hand, the user has chosen manual marking in the decision block 183, then regardless of the result in the decision block 189, the preferred process will invoke the mark problems control panel view 10 and the marking tool 14 in block 191. If, in decision block 189, the user has chosen both computer and user marking, the automatic computer marking of block 187 preferably can execute simultaneously with manual marking. Following path 198 to block 193, the preferred method can read the first word in the selected portion of the electronic document. Following the path 200 to block 201, the word can be displayed in the current-word text box 35 of the mark problems control panel view 10. If the user suspects a textual error in decision block 199, the user can visibly mark the word in block 203, for instance, using the mark button 30. Otherwise, if in decision block 197 there remain additional words in the selection and, if in decision block 195, the user has not terminated the marking process, then returning along path 212 to block 193, the preferred method can read the next word in the selected portion of the electronic document.

Figure 7:
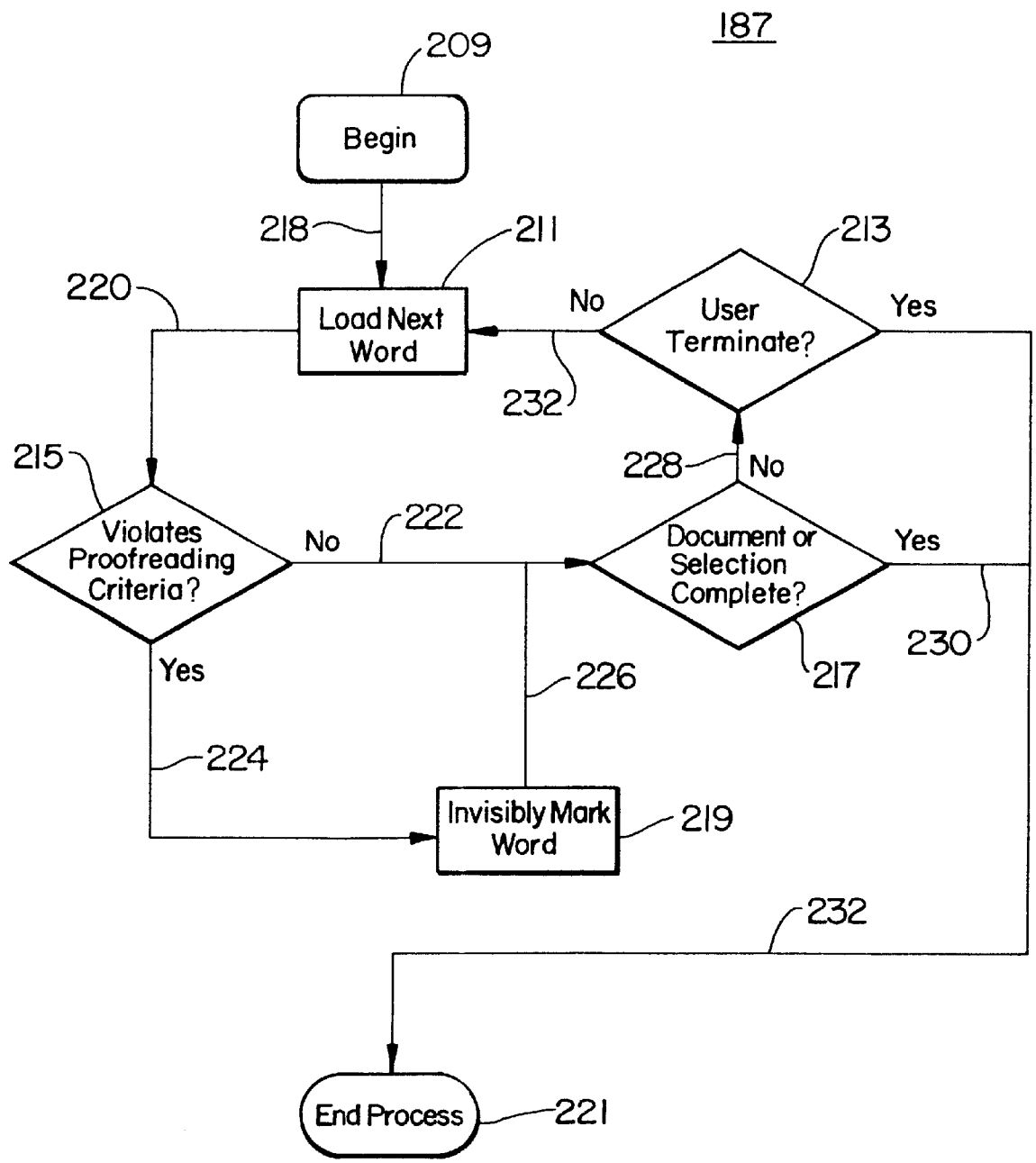
FIG. 7 is a flow chart showing a method for automatically marking textual errors in an electronic document for use with the method shown in FIG. 6.

FIG. 7 is a flow chart showing the method for automatically marking textual errors referred to in block 187 as shown in FIG. 6. The preferred method for automatically marking textual errors can begin by loading the next word in the selected portion of the electronic document in block 211. Following path 220, if the word violates the proofreading criteria set forth, for instance, in the advanced options interface 50 or the grammar rules 9, following the path 224, the preferred method can invisibly mark the word. Otherwise, the preferred method can accept the word as textually correct. In either event, if in decision block 217 there remain additional words in the selection and, if in decision block 213, the user has not terminated the marking process, then returning along path 232 to block 211, the preferred method can read the next word in the selected portion of the electronic document.

Figure 8:
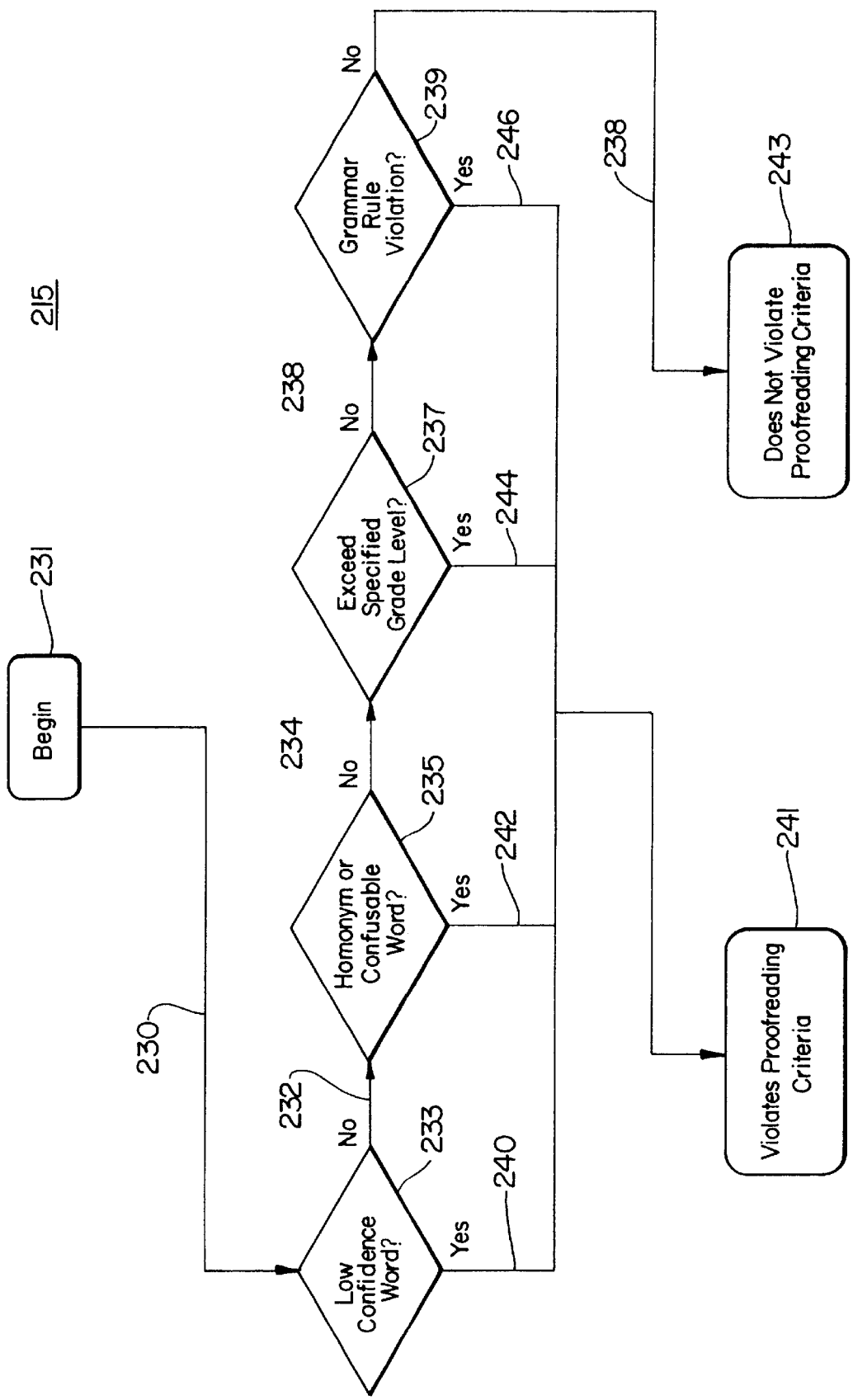
FIG. 8 is a flow chart showing a method for determining whether a word violates proofreading criteria for use with the method shown in FIG. 7.

FIG. 8 is a flow chart showing a method for determining whether a word violates proofreading criteria referred to in block 215 as shown in FIG. 7. Beginning in block 231 and following path 230 to the decision block 233, if the automated marking tool 19 recognizes the current word as a low confidence word, following path 240 to block 241, the automated marking tool 19 can report the current word as a textual error in violation of the proofreading criteria. Similarly, following path 232 to decision block 235, if the automated marking tool 19 recognizes the current word as a homonym or confusable word, following path 242, the automated marking tool 19 can report the current word as a textual error. Following the path 234 to decision block 237, if the current word exceeds the grade level specified in the word grade level control 7 in the advanced options interface 50, following path 244 to block 241, the automated marking tool 19 can report the current word as a textual error. Finally, if the automated marking tool 19 recognizes the current word to be in contravention of any of the selected grammar rules 27 contained in the grammar rules control interface 9, following the path 246 to block 241, the automated marking tool 19 can report the current word as a textual error. In all other cases, following the path 238 to block 243, the automated marking tool 19 can report the current word to be textual correct and not in violation of the proofreading criteria set for in both the advanced proofreading options interface 50 and the grammar rules controls interface 9.

Figure 9:
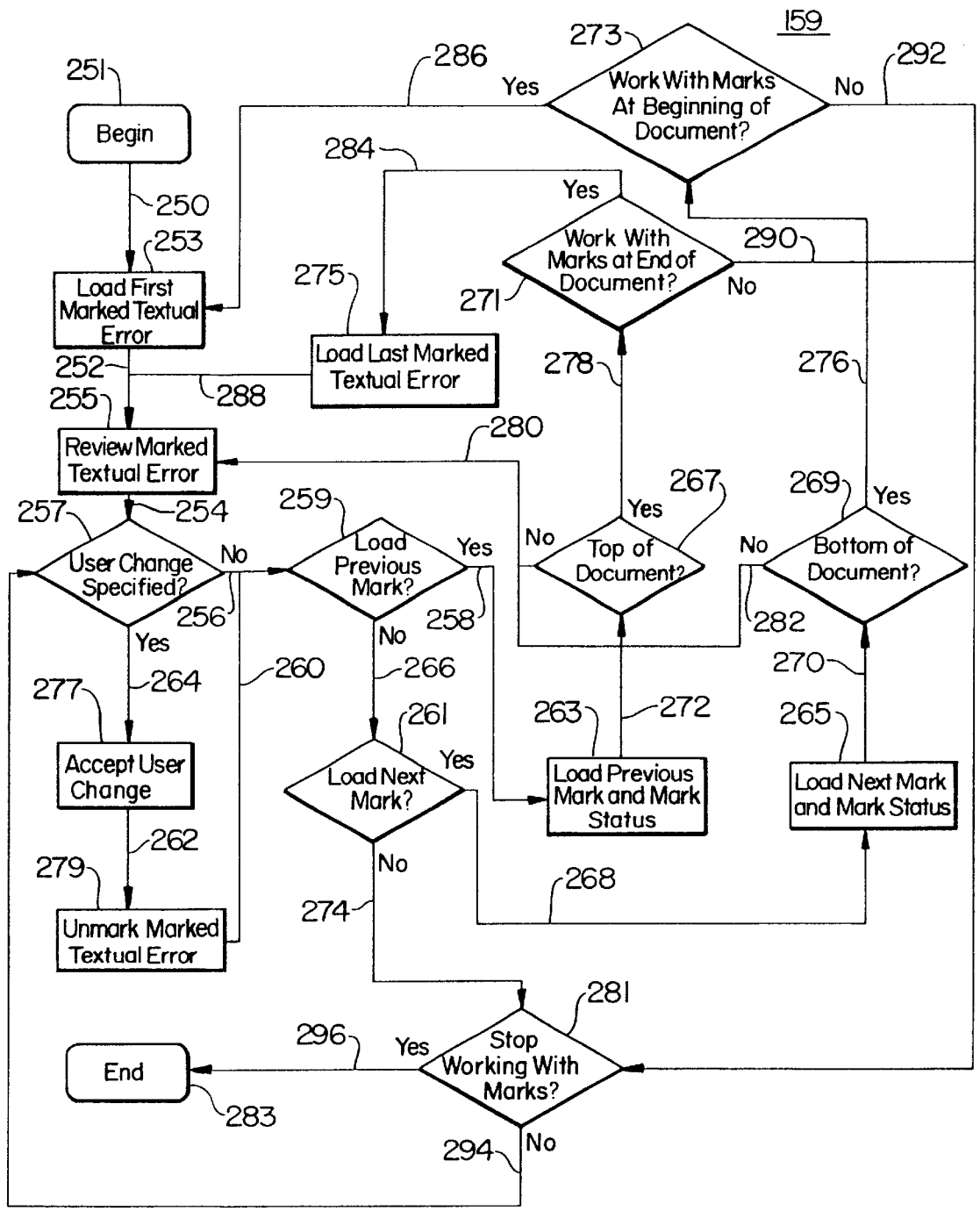
FIG. 9 is a flow chart showing a method for editing textual errors in an electronic document for use with the method illustrated in FIG. 4.

FIG. 9 is a flow chart showing a method for editing textual errors in an electronic document, as shown in block 159, for use with the method illustrated in FIG. 4. The method illustrated in FIG. 9 begins in block 251, following path 250 to block 253 in which preferred process loads the first marked textual error. Following path 252 to block 255, the user can review the current marked textual error. If, in decision block 257, in reviewing the marked textual error, the user changes the text in the electronic document, following the path 264 to block 277, the preferred process can accept the user change and, in block 279, can remove the marked textual error.

Regardless of whether the user proposes a change in decision block 257, the user can choose to review the previous mark in decision block 259, or following path 266 to decision block 261, the user can choose to review the next mark. If the user chooses to review the previous mark, following the path 258 to block 263, the preferred process can load the previous mark and the corresponding mark status. If, following path 272 to the decision block 267, the mark processor 15 reaches the top of the selected portion of the electronic document, following the path 278 to decision block 271, the user can be presented with an option to terminate mark processing in decision block 281, or to work with marks beginning at the end of the electronic document. If the user chooses to work with marks beginning at the end of the electronic document in decision block 271, following path 284 to block 275, the last marked textual error in the electronic document is loaded for consideration in the reviewing step of block 255.

Similarly, if, in the decision block 261, the user chooses to review the next mark, following the path 268 to block 265, the preferred process can load the next mark and the corresponding mark status. If, following the path 270 to the decision block 269, the mark processor 15 reaches the bottom of the selected portion of the electronic document, following path 276 to decision block 273, the user can be presented with an option to terminate mark processing in decision block 281, or to work with marks beginning at the beginning of the electronic document. If the user chooses to work with marks beginning at the beginning of the electronic document in decision block 273, following path 286 to block 253, the first marked textual error in the electronic document is loaded for consideration in the reviewing step of block 255.

Figure 10:
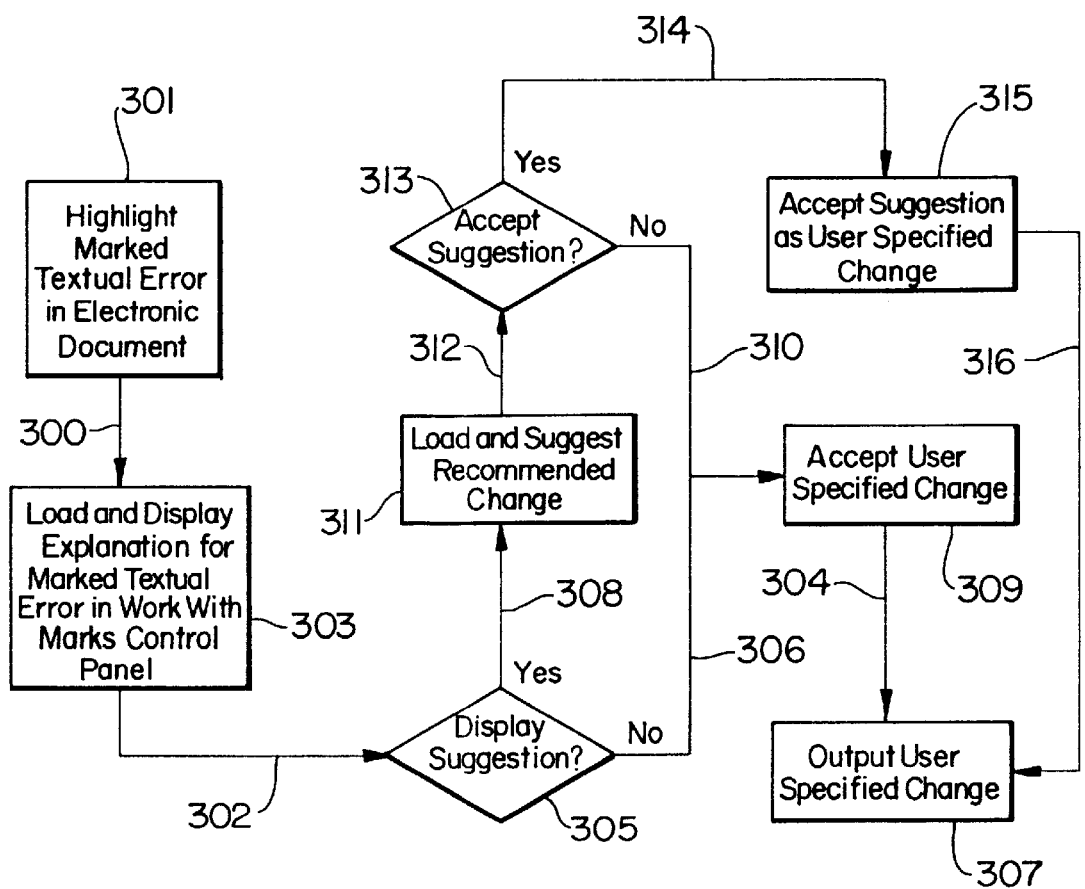
FIG. 10 is a flow chart showing a method for reviewing marked textual errors in an electronic document for use with the method illustrated in FIG. 9.

FIG. 10 is a flow chart showing a method for reviewing marked textual errors in an electronic document, as referenced in block 255, for use with the method illustrated in FIG. 9. The reviewing method begins in step 301 by highlighting the current marked textual error in the electronic document, for instance by using highlighter 22. Following path 300 to block 303, the mark processor 15 can query the explanation engine 23 for an explanation for the marked textual error. Moreover, the mark processor can display the explanation in the status line 43 of the work with marks control panel view 11. Following path 302, the mark processor can also query the suggestion engine 24 for a suggested correction to the marked textual error. If, in decision block 305, a suggestion has been returned by the suggestion engine 24, following path 308 to block 311, the mark processor 15 can load and display the suggestion in the suggestion panel 12. If, in block 313, the user accepts the suggestion, for instance by clicking on the accept suggestion button 44, then following path 314 to block 315, the preferred mark processor can accept the suggestion as a user specified change and in block 307, can output the user specified change to decision block 257.

If, in decision block 313, the user chooses not to accept the suggestion provided in block 311, the preferred method still can allow a user specified change in block 309. Following path 304 to block 307, the preferred method can output any user specified change to decision block 257. Similarly, if in decision block 305, the suggestion engine 24 does not provide a suggested correction to the marked textual error, following path 306 to block 309, the user still can specify a change to the marked textual error. Again, following path 304 to block 307, the preferred method can output any user specified change to decision block 257.

The preferred system 1 represents an effective proofreading and correction system. One skilled in the art will recognize that the preferred embodiment can significantly improve dictation throughput in terms of correct words per minute, without sacrificing the flexibility necessary to effectively proofread and correct an electronic document. Thus, the preferred embodiment of the system for proofreading and correcting dictated text in an electronic document 1, as documented in this disclosure, can provide a mechanism for users of such systems to effectively proofread and correct dictated text.

What is claimed is:

1. A method for proofreading and correcting user dictated text contained in an electronic document, comprising the steps of:

selecting proofreading criteria for identifying textual errors contained in dictated text in said electronic document, wherein said selecting step comprises the steps of specifying a low confidence word threshold below which any word will be identified as a textual error, enabling homonym and confusable word criteria whereby any homonym and confusable word will be identified as a textual error, and specifying a word grade level above which any word will be identified as a textual error;

audibly playing back each word contained in said dictated text in said electronic document, said step of audibly playing back each word further comprising sequentially highlighting each said word contained in said electronic document, visually displaying each said sequentially highlighted word in a user interface separate from a user interface used to display said electronic document, providing user voice audio playback using user voice data corresponding to each said highlighted word in said electronic document in coordination with said visually displaying step, generating text-to-speech audio playback for each said highlighted word in said-electronic document not having corresponding user voice data, and providing said text-to-speech audio playback in coordination with said visually displaying step; and, during said audible playback, marking as a textual error each said played back word in nonconformity with at least one of said proofreading criteria, wherein said marking step comprises automatically marking as a textual error each said replayed word inconsistent with said proofreading criteria.

2. The method of claim 1, wherein said selecting step comprises the steps of:

generating a grammar rules check list for reference by a grammar checker; and, enabling grammar checking whereby any word or phrase inconsistent with said grammar rules will be identified as a textual error.

3. The method of claim 1, wherein said displaying step further comprises:

visually displaying immediately before said visually displayed highlighted word at least one word preceding said highlighted word in said electronic document; and, visually displaying immediately after said visually displayed highlighted word at least one word succeeding said highlighted word in said electronic document.

4. The method of claim 1, wherein said audibly playing back step further comprises the steps of:

sequentially highlighting each said word contained in said electronic document; and, visually displaying each said sequentially highlighted word in a user interface separate from a user interface used to display said electronic document.

5. The method of claim 1, further comprising the step of editing each said marked textual error identified in said marking step.

6. The method of claim 5, wherein said editing step comprises:

reviewing each said marked textual error identified in said marking step;

accepting user specified changes to each marked textual error reviewed in said reviewing step; and, unmarking each marked textual error corrected by said user in said accepting step.

7. The method of claim 6, wherein said reviewing step comprising the steps of:

highlighting each said word in said electronic document corresponding to said marked textual error marked in said marking step; and, displaying an explanation for each said marked textual error in a user interface.

8. A method according to claim 6, wherein said reviewing step further comprises the steps of:

suggesting a recommended change to said marked textual error;

displaying said recommended change in said user interface; and, accepting a user specified preference to substitute said recommended change for said marked textual error.

9. A method according to claim 6, further comprising the step of unmarking each said marked textual error corresponding to a user command to unmark said marked textual error.

10. An electronic system for proofreading and correcting dictated text in an electronic document, wherein said electronic system comprises:

a proofreading tool for identifying and correcting textual errors in dictated text in said electronic document;

a proofreading options interface for storing proofreading criteria for use with said proofreading tool; and, a control panel for interacting with said proofreading tool.

11. An electronic system for proofreading and correcting dictated text in an electronic document according to claim 15 further comprising a voice command processor for controlling said user interface.

12. An electronic system for proofreading and correcting dictated text according to claim 10, wherein said marking tool further comprises a grammar checker for identifying grammatical errors contained in said electronic document.

13. An electronic system for proofreading and correcting dictated text according to claim 10, wherein said mark processor comprises:

a highlight for sequentially distinguishing each word contained in said dictated text identified and marked as a textual error by said marking tool;

an explanation engine having explanations for each said textual error;

messaging means for transmitting said explanations to said control panel; and, means for editing said textual error.

14. The method of claim 1, wherein said marking step further comprises manually marking as a textual error each said replayed word suspected of violating at least one of said proofreading criteria, said manually marking step occurring simultaneous to said automatic marking step.

15. An electronic system for proofreading and correcting dictated text according to claim 10, wherein said proofreading options interface comprises:

a grammar rules control interface containing grammar rules for reference by a grammar checker; and, a grammar rules switch for enabling marking of words or phrases inconsistent with said grammar rules by said grammar checker.

16. An electronic system for proofreading and correcting dictated text according to claim 10, wherein said control panel comprises:

a mark problems view for controlling said marking tool; and, a work with marks view for controlling said mark processor.

17. An electronic system for proofreading and correcting dictated text according to claim 16, wherein said mark problems view comprises:

a playback speed control for prescribing a rate of playback by said playback system;

a pause button for accepting a command to pause said playback of said dictated text;

a mark button for accepting a user command to manually mark said displayed word as a textual error; and, message transmitting means for transmitting said mark command to said marking tool;

message transmitting means for transmitting said prescribed rate and said pause command to said playback system;

message receiving means for receiving each word played back by said playback system; and, a current-word text box for displaying each word received by said message receiving means.

18. An electronic system for proofreading and correcting dictated text according to claim 16, wherein said work with marks view comprises:

message receiving means for receiving data from said mark processor; and, a status line for displaying an explanation generated by an explanation engine and received by said message receiving means.

19. An electronic system for proofreading and correcting dictated text according to claim 18, wherein said work with marks view further comprises:

a suggestion panel for displaying a suggested correction generated by a suggestion engine and received by said message receiving means;

a suggestion button for accepting a user specified preference to substitute said suggested correction for said marked textual error; and, message transmitting means for transmitting said substitution preference to said mark processor.

20. A computer apparatus programmed with a routine set of instructions stored in a fixed medium, said computer apparatus comprising:

means for selecting proofreading criteria for identifying textual errors contained in dictated text in said electronic document;

means for audibly playing back each word contained in said dictated text in said electronic document; and, means for marking as a textual error each said played back word in nonconformity with at least one of said proofreading criteria while audibly playing back each word contained in said dictated text in said electronic document.

21. The computer apparatus of claim 20, wherein said selecting means comprises:

means for generating a grammar rules check list for reference by a grammar checker; and, means for enabling grammar checking whereby any word or phrase inconsistent with said grammar rules will be identified as a textual error.

22. The computer apparatus of claim 20, wherein said displaying means further comprises:

means for visually displaying immediately before said visually displayed highlighted word at least one word preceding said highlighted word in said electronic document; and, means for visually displaying immediately after said visually displayed highlighted word at least one word succeeding said highlighted word in said electronic document.

23. The computer apparatus of claim 20, wherein said marking means further comprises means for manually marking as a textual error each said replayed word suspected of violating at least one of said proofreading criteria, said manually marking means marking each said textual error simultaneous to said automatic marking of said automatic marking means.

24. The computer apparatus of claim 20, further comprising means for editing each said marked textual error identified in by said marking means.

25. The computer apparatus of claim 24, wherein said editing means comprises:

means for reviewing each said marked textual error identified by said marking means;

means for accepting user specified changes to each marked textual error reviewed by said reviewing means; and, means for unmarking each marked textual error corrected by said user using said accepting means.

26. The computer apparatus of claim 25, wherein said reviewing means comprises:

means for highlighting each said word in said electronic document corresponding to said marked textual error marked by said marking means; and, means for displaying an explanation for each said marked textual error in a user interface.

27. A computer apparatus according to claim 25, wherein said reviewing means further comprises:

means for suggesting a recommended change to said marked textual error;

means for displaying said recommended change in said user interface; and, means for accepting a user specified preference to substitute said recommended change for said marked textual error.

28. A computer apparatus according to claim 25, further comprising unmarking means for unmarking each said marked textual error corresponding to a user command to unmark said marked textual error.

* * * * *